United States Patent
De Rosa et al.

(10) Patent No.: US 10,221,252 B2
(45) Date of Patent: Mar. 5, 2019

(54) CHONDROITIN SULPHATE PURIFICATION METHOD

(71) Applicant: Altergon S.A., Lugano (CH)

(72) Inventors: Mario De Rosa, Lugano (CH); Chiara Schiraldi, Naples (IT)

(73) Assignee: ALTERGON S.A., Lugano (CH)

( * ) Notice: Subject to any disclaimer, the term of this patent is extended or adjusted under 35 U.S.C. 154(b) by 20 days.

(21) Appl. No.: 15/124,675

(22) PCT Filed: Mar. 20, 2015

(86) PCT No.: PCT/EP2015/055882
§ 371 (c)(1),
(2) Date: Sep. 9, 2016

(87) PCT Pub. No.: WO2015/140281
PCT Pub. Date: Sep. 24, 2015

(65) Prior Publication Data
US 2017/0022295 A1     Jan. 26, 2017

(30) Foreign Application Priority Data
Mar. 21, 2014 (IT) .............................. MI2014A0486

(51) Int. Cl.
*C08B 37/00*     (2006.01)

(52) U.S. Cl.
CPC ...... *C08B 37/0069* (2013.01); *C08B 37/0063* (2013.01); *C08B 37/0066* (2013.01)

(58) Field of Classification Search
None
See application file for complete search history.

(56) References Cited

FOREIGN PATENT DOCUMENTS

RU     2458134 C1     8/2012

OTHER PUBLICATIONS

Rao, J. R., & Nair, B. U. (2011). Novel approach towards recovery of glycosaminoglycans from tannery wastewater. Bioresource technology, 102(2), 872-878. (Year: 2011).*
Galeotti, et al., "Selective removal of keratin sulfate in chondroitin sulfate samples by sequential precipitation with ethanol", Analytical Biochemistry, vol. 338, Dec. 1, 2013, pp. 113-115.
Roden, et al., "Isolation and characterization of connective tissue polysaccharides", Methods in Enzymology, vol. 28, Jan. 1, 1973, pp. 73-140.
Search Report and Written Opinion of PCT/EP2015/055882 dated Jul. 10, 2015.
Swett, et al., "Proteoglycan synthesis by articular chondrocytes in agarose culture", South African Journal of Science, vol. 83, No. 3, Mar. 1, 1987, pp. 153-156.
Letter reporting office action issued in counterpart Russian application No. 2016137266/13(058727).
Office Action dated Sep. 28, 2018 in counterpart Russian application No. 2016137266/13(058727).
Search Report issued in counterpart Russian Application No. 2016137266/13(058727).

* cited by examiner

*Primary Examiner* — Shaojia A Jiang
*Assistant Examiner* — Dale R Miller
(74) *Attorney, Agent, or Firm* — Silvia Salvadori, P.C.; Silvia Salvadori

(57) ABSTRACT

The present invention relates to a downstream industrial method of purifying chondroitin sulphate obtained from animal cartilage, which produces a product fully compliant with the specifications required for the use of said compound in the pharmaceutical field.

7 Claims, No Drawings

CHONDROITIN SULPHATE PURIFICATION METHOD

This application is a U.S. national stage of PCT/EP2015/055882 filed on 20 Mar. 2015, which claims priority to and the benefit of Italian Application No. MI2014A000486 filed on 21 Mar. 2014, the contents of which are incorporated herein by reference in their entireties.

The present invention relates to an industrial process for the purification of chondroitin sulphate (CS) obtained from animal cartilage, which affords a product fully compliant with the specifications required for the use of said compound in the pharmaceutical field. In particular, the process developed allows the elimination of keratan, a glycosaminoglycan which, as demonstrated by modern analysis techniques, is present in all CS preparations obtained by various extraction methods from different types of animal source.

Definitions

Glycosaminoglycans (GAGs) means the complex family of polysaccharides, which are fundamental constituents of extracellular matrix.

The term [4)-β-D-GlcA-(1→3)-β-D-GalNAc-(1→] means the disaccharide formed by D-glucuronic acid (D-GlcA) and N-acetyl-D-galactosamine (D-GalNAc), bonded with a β-glycosidic bond (1-3).

The term [4)-α-L-IduA-(1→3)-β-D-GalNAc-(1→] means the disaccharide formed by L-iduronic acid (L-IduA) and N-acetyl-D-galactosamine (D-GalNAc), bonded with a β-glycosidic bond (1-3).

The term chondroitin sulphate (CS) means variously sulphated glycosaminoglycans of different molecular weights, which are present in various animal tissues. The saccharide backbone of CS consists of disaccharide units [4)-β-D-GlcA-(1→3)-β-D-GalNAc-(1→] repetitively bonded with β-glycosidic bonds □(1→4). The abbreviation CS refers to both the acid form and the salified form of said polysaccharides.

The abbreviation CS-typeA means a CS characterised by the prevalence of type CS-A disaccharide units [4)-β-D-GlcA-(1→3)-β-D-GalNAc4SO$_3^-$-(1→];

The term chondroitin/dermatan sulphate, abbreviated to CS/DS, also known as CS-typeB, not to be confused with the disaccharide structural variant CS-B, means variously sulphated glycosaminoglycans of different molecular weights, present in various animal tissues, wherein the saccharide backbone consists of different amounts of disaccharide units 4)-β-D-GlcA-(1→3)-β-D-GalNAc-(1→] and [4)-α-L-IduA-(1→3)-β-D-GalNAc-(1→], bonded with β-(1→4) glycoside bonds. The abbreviation CS or CS-typeB refers to both the acid form and the salified form of said polysaccharides.

The abbreviation CS-typeC means a CS characterised by the prevalence of type CS-C disaccharide units [4)-β-D-GlcA-(1→3)-β-D-GalNAc6SO$_3^-$-(1→].

The term keratan sulphate (KS) means variously sulphated glycosaminoglycans of different molecular weights, which are present in various animal and fish tissues. The saccharide backbone of KS consists of disaccharide units [3)-β-D-Gal-(1→4)-β-D-GlcNAc-(1→]. The abbreviation KS refers to both the acid form and the salified form of these polysaccharides.

The abbreviation CS/KS means the KS-contaminated CS products currently on the market.

PRIOR ART

Chondroitin sulphate (CS) is a glycosaminoglycan consisting of repeating disaccharide units of [4)-β-D-GlcA-(1→3)-β-D-GalNAc-(1→] bonded together with β-glycosidic bonds (1→4). When some -β-D-GlcA units are substituted on the polysaccharide chain by -α-L-IduA-, the term CS-typeB (not to be confused with the structural variant disaccharide CS-B), also called dermatan sulphate (abbreviated to CS/DS), is used.

Depending on the sulphation sites, there are various types of structural disaccharides of chondroitins/dermatans.

In vivo the various types of CS, during polymerisation, are sulphated by specific sulphotransferases and then, bonded covalently to specific proteins, are secreted in the extracellular matrix as proteoglycans. They are ubiquitous ingredients of various connective tissues, such as cartilage, skin, blood vessels and bone (Abu, K. & Seno, N., The Basis of Carbohydrate Chemistry, 1993, 142-177, Japan: Kodansha).

CS is copiously distributed in living organisms, wherein it plays a central role in the biological processes. In particular, CS acts as a regulator of growth factors, cytokines, chemokines, adhesion molecules and lipoproteins, by means of interactions with the ligands of said proteins through specific saccharide domains (Malavaki C., et al., Connect Tissue Res 2008, 49, 133-139).

Table 1 shows the structural parameters of the main types of CS purified by different organisms. In particular, the molecular mass parameters are fairly similar for CS from animal sources (bovine, porcine, chicken), but fairly different from those of marine origin (shark, skate, squid), the latter having a greater molecular mass than the former. CS samples of marine origin also have a charge density greater than 1, due to the presence of disulphated disaccharides, whereas CS samples of animal origin (bovine, porcine, chicken) have a charge density of less than 1.

TABLE 1

Structural data of the main types of purified CS from different organisms.

|  | Bovine | Porcine | Chicken | Skate | Squid | Shark |
|---|---|---|---|---|---|---|
| Mn (KDa) | 12-17 | 9-14 | 8-13 | 27-34 | 60-80 | 25-40 |
| Mw (KDa) | 20-26 | 14-20 | 16-21 | 50-70 | 80-120 | 50-70 |
| Polydispersity | 1.8-2.2 | 1.4-1.8 | 1.6-2.0 | 1.2-2.5 | 0.8-1.3 | 1.0-2.0 |
| CS-O | 6 | 6 | 8 | 3 | 13 | 3 |
| CS-C | 33 | 14 | 20 | 39 | 15 | 44 |
| CS-A | 61 | 80 | 72 | 43 | 50 | 32 |
| CS-D | ND | ND | ND | 13 | 0 | 18 |
| CS-E | ND | ND | ND | 1 | 22 | 2 |
| CS-B | ND | ND | ND | 1 | 0 | 1 |
| Charge density | 0.90-0.96 | 0.92-0.96 | 0.90-0.94 | 1.08-1.20 | 1.00-1.20 | 1.15-1.25 |

In view of these multiple functions, CS has been used in pharmaceutical, nutraceutical and cosmeceutical products (Koga, T., New Food Industry, 1989, 31, 4-7; Park, D. C. & Kim, S. B., Fisheries Research, 1998, 12, 30-39; Cho, S. M., et al., Food Hydrocolloids, 2004, 18, 573-579; Cho, S. Y., et al., Biological & Pharmaceutical Bulletin, 2004, 27, 47-51; Takuo, N., et al., Recent Patents on Food, Nutrition & Agriculture, 2010, 2, 61-74).

CS is currently the active ingredient of numerous antiarthritis drugs. CS makes a significant contribution to determining the biomechanical properties of cartilage, as it lubricates the joints and confers mechanical resistance to compressive stresses.

A number of potential pharmaceutical applications of CS, partly depending on the type of sulphation, were recently described (Hiraoka et al Glycobiology 2001, 11(6), 495-504; Malavaki C., et al., Connect Tissue Res 2008, 49, 133-139; Lauder R. M., Complement Ther Med 2009, 17:56-62.).

Recent studies have demonstrated that CS plays an important role in tumour progression and metastasis formation. In tumour cells in particular, alterations of the chain length and sulphation positions of the CS molecule have been found (Smetsers et al., J Invest Dermatol 2004, 122(3):701-716). This has allowed the use of CS as a biomarker for early diagnosis of ovarian tumours (Pothacharoen et al., J Cell Sci 2006, 113, 193-205).

These characteristics have made CS an important pharmacological means for many years, increasing interest in its production, which is currently based on techniques involving extraction from various animal tissues. In particular CS is extracted from shark cartilage, bovine trachea and some by-products of pig slaughter. Due to the high degree of purification required, this process is very complex and expensive, involving the use of enzymes, antibiotics and considerable volumes of organic solvents. The processing also suffers from considerable operational difficulties associated with the unpleasant processing odour and the production of highly pollutant wastewater; moreover, the use of animal tissues as a raw material in the extraction process can lead to the transmission of viral and prion infections between species (Schiraldi et al., 2010).

The production of CS from cartilaginous materials of animal origin is described in detail in the scientific and patent literature. All processes usually involve the following steps: cartilage homogenisation; chemical degradation (alkaline hydrolysis) and/or enzymatic degradation (trypsin, papain, Alcalase and Neutrase made by Novozyme) of the proteoglycan matrix to separate the protein component from the carbohydrate component; filtration to remove insoluble residues; a plurality of precipitation processes with solvents,

TABLE 2

Potential medical and pharmaceutical applications of CS (Schiraldi, C., et al., Applied Microbiology and Biotechnology, 2010, 87, 1209-1220).

| CS | Source | Potential therapeutic applications/Reference literature |
|---|---|---|
| CS-O, CS-A, CS-C | CS, Condrosulf ®; shark fin | Anti-inflammatory<br>Ronca et al. Osteoarthritis Cartilage, 1998, 6(Suppl A): 14-21 |
| CS-O, CS-A, CS-C | CS, Condrosulf ®; shark fin | Osteoarthritis<br>Ronca et al. Osteoarthritis Cartilage, 1998, 6(Suppl A): 14-21<br>Michael et al., IBSA Satellite Symposium, Annual European Congress of Rheumatology (EULAR), Stockholm, 12, 5 Jun. 2002 |
| CS-E | Squid cartilage | Antiviral<br>Bergefall et al., J Biol Chem, 2005, 280(37), 32193-32199 |
| CS-A, CS-E | Sturgeon, whale or squid cartilage | Malaria vaccine<br>Alkhalil et al., J Biol Chem, 2000, 277(11), 8882-8889. |
| CS-F | Holothuria | Antitumoral<br>Borsig et al., J Biol Chem, 2007, 282(20), 14984-14991 |
| CS-C | Shark cartilage | Antitumoral<br>Pumphrey et al., Cancer Res, 2002, 62(13), 3722-3728 |
| CS epitope WF6 | Human | Biomarker for ovarian and epithelial cancer<br>Pothacharoen et al., J Biochem 2006, 140(4), 517-524 |
| CS-O | Human | Biomarker for prostate cancer<br>Sakko et al. Cancer Epidemiol Biomark Prev, 2008, 17, 2488-2497 |
| CS/DS | Not reported | Liver regeneration<br>Yamaguchi et al., Glycoconj J, 2006, 23(7-8), 513-523 |
| CS-A, CS-C, CS-E | Bovine trachea, shark cartilage | Repair of central nervous system<br>Fraser et al., J Biol Chem, 2001, 273(9), 6412-6419 |
| CS-DS | Sigma (C4170) | Neuroprotective<br>Rolls et al., Eur J Neurosci, 2004, 20(8), 1973-1983 |
| Gelatin/CS-C/HA | Not reported | Wound repair, keratinocyte activation<br>Wang et al,. Biomaterials, 2006, 27, 5689-5697 |
| CS-ADH/ polyethylene glycol dialdehyde | Not reported | Maxillary sinus wound repair<br>Gilbert et al., Laryngoscope, 2004, 114 (8), 1406-1409 |
| CS-A, CS-C | C-4-S, C-6-S, Sigma | Wound healing<br>Zou et al., Acta Biomater, 2009, 5(5), 1588-1595 | usually ethanol, to purify/recover the polysaccharide of interest; chromatographic separation with ion-exchange resins; decolouring with activated carbon; drying and grinding of the dried product; packaging.

The use of CS as a medicament and nutraceutical has been associated with specific purity criteria for the raw material defined in fairly similar ways by the regulatory authorities of various countries. At present, according to the US and EU Pharmacopoeias, the standard test to determine the CS content is a photometric titration method conducted with hexadecyltrimethylammonium bromide as titrant. The titration method exhibits linearity between 0.5 and 7.5 mg of the CS standard (Sigma), but it has been demonstrated that in the presence of other GAGs or nucleic acids, there are titration curves with overestimated endpoints (http://siga.ufjf.br/Reeport Laboratório de Análise de Glicoconjugados—UFJF). These results indicate that the titration method has low specificity, because it may overestimate the quantitation of CS in the presence of other anionic compounds. Other methods specified by the US and EU Pharmacopoeias involve infrared spectroscopy, determination of specific rotatory power and electrophoresis on cellulose acetate, all of which methods, as indicated below, now exhibit their considerable limitations in determining the degree of purity of GAG-based preparations.

In the last few years, the great scientific interest in GAGs and their potential applications, the development of new and more sophisticated approaches to the characterisation of these polysaccharides, and the development of new strategies for separating the various types of GAG, have demonstrated (Pomin, V. H. et al., Carbohydrate Polymers, 2012, 90, 839-846) that the analysis methods originally used by the regulatory authorities to define the degree of purity of the commercial preparations of CS destined for pharmaceutical and nutraceutical use are inadequate, and that even the reference standards as proposed by the US and EU Pharmacopoeias are not pure, but significantly contaminated with keratan sulphate (KS), a mixture of variously sulphated glycosaminoglycans with different molecular weights, the structure of which is based on disaccharide units [3)-β-D-Gal-(1→4)-β-D-GlcNAc-(1→] bonded together with β-glycosidic bonds (1→3).

Pomin et al. (Carbohydrate Polymers, 2012, 90, 839-846) analysed 17 commercial batches of CS for oral use, 3 of which were obtained from bovine cartilage and 14 from fish cartilage, and the standards indicated as reference products by the US and EU Pharmacopoeias. The analysis methodologies adopted by these authors were agarose gel electrophoresis; HPLC on strong anion-exchange resins (SAX) and size exclusion resins (SEC); digestibility with specific GAG-lyases; estimated uronic acid levels; 1D and 2D NMR. In particular the authors (Table 3) found that on average, KS represents about 16% of the total GAGs found in formulations obtained from shark cartilage, and obtained a similar finding with the EU Pharmacopoeia standard, also obtained from shark cartilage.

As shown in Table 3, large amounts of KS are present in CS of marine origin, which leads to a considerable reduction in CS content compared with the stated amount and means that the product is incompatible with use, especially as a medicament, which requires high degrees of purity (Volpi, N., J. Pharm. Sci., 2007, 96, 3168-3180).

Pomin et al. demonstrated that the agarose gel electrophoresis developed by them, similarly to the cellulose acetate electrophoresis recommended by the US and EU Pharmacopoeias, is unable to demonstrate KS contamination, because this GAG co-migrates with CS. Moreover, SEC-HPLC is unable to demonstrate the presence of KS in CS formulates, whereas SAX-HPLC proved to be the most appropriate method for identifying KS contamination, as CS and KS have sufficiently different elution times, but not so different as to prevent partial overlap of the peaks, which can cause erroneous quantitative evaluations of contamination. A sufficiently diagnostic, but not quantitative, method for identifying the presence of KS in CS formulates is 1D $^1$H-NMR, as indicated by the well-resolved isolated groups of signals at 4.68 and 4.37-4.30 ppm characteristic of KS (Limtiaco, J. et al., 2012, Analytical Methods, 4, 1168-1172; Pomin, V. H., et al., 2010, Analytical Chemistry, 82, 4078-4088; Rudd, T. R., et al., 2011, The Analyst, 136, 1390-1398, Zhang, T., et al., 2009, J. Pharmaceutical Science, 98, 4017-4026).

TABLE 3

Proportions of CS and KS in batches of oral formulations of CS obtained from shark and bovine cartilage, and EU and US Pharmacopoeia standards. The proportions were obtained from the integrals of the HPLC-SAX profiles (Pomin, V. H. et al., Carbohydrate Polymers, 2012, 90, 839-846).

| Sample | Batch number | CS % of total as mean ± SD | KS |
|---|---|---|---|
| Shark cartilage | 14 | 84.2 ± 14 | 15.8 ± 1.4 |
| Bovine cartilage | 3 | 100 | — |
| EU Pharmacopoeia standard | 1 | 90 | 10 |
| US Pharmacopoeia standard | 1 | 100 | — |

On the basis of the KS contamination data found, Pomin et al. indicate the need for a review of the methodologies specified in the US and EU Pharmacopoeias, to provide a more correct definition of the amount of bioactive ingredient present in commercial formulations of CS.

The development of new analysis methods able to identify KS contamination obviously requires a substantial review of CS production methods to reduce the levels of KS contamination to within limits compatible with the use of CS as a medicament and nutraceutical.

Galeotti F., et al. (Analytical Biochem, 2013, YABIO 1157926.12.13) define the selective precipitation conditions of CS and KS from commercial preparations of CS/KS obtained from shark cartilage by gradual addition of ethanol saturated with sodium acetate to a solution containing 33 mg/mL of CS/KS. The precipitation of chondroitin alone is completed with 1 volume of ethanol. In the same study the authors state that precipitation with methanol, propanol or acetone does not allow selective removal of KS. Previously, the same group (Volpi N., J Chromatography B, 1996, 685, 27-34), when describing the precipitation of 110 mg/mL mixtures of glycosaminoglycans with ethanol in the presence of 2% NaCl, indicated that complete precipitation of CS is only obtained between 1.2 and 1.6 volumes.

All the current methods of industrial production of CS are based on product purity criteria inadequate to demonstrate KS contamination. In the short term, as soon as the regulatory authorities, which are already aware of the issues, have adapted the standards and characterisation methods to take account of the new analysis opportunities, this will make all the CS products now on the market unsuitable for pharmaceutical use, and strongly undertitrated for use in the production of nutraceuticals and cosmeceuticals.

Thus despite the large number of extraction/purification methods developed to date, industrial research is currently being conducted into new processes that produce a CS, especially as regards the pharmaceutical grade, that complies with the new purity standards to which the regulatory authorities are adjusting the specifications of CS, especially in relation to KS contamination, which is still not included among the analysis methods in the current Pharmacopoeia.

In this context the development of a simple purification process, applicable to the various CS products contaminated by KS (CS/KS) now in existence, represents an important and topical industrial objective.

DESCRIPTION OF THE INVENTION

The development of more adequate investigation methodologies demonstrates that the extent of the problem of KS contamination of the CS preparations currently on the market is even larger and more widespread than reported by Pomin, et al., (Carbohydrate Polymers, 2012, 90, 839-846), affecting not only CS products obtained from raw materials of marine origin but also, albeit to a lesser extent, those obtained from other animal sources (cattle, pigs, poultry, etc.).

A method has now been found which, at limited cost and with the types of machinery already existing, starting from the CS/KS preparations currently on the market, enables KS to be removed by a final treatment or targeted modifications of the processes currently developed at industrial level, thus restoring the product specifications of CS to values which, in the short term, will be required at international level by the regulatory authorities, especially for pharmaceutical grade CS.

The process, which is of a completely different type from the current techniques of fractional precipitation with solvents, is characterised by considerable operational versatility, and once designed is simple and has no significant difficulties for industrial scale-up. The process is characterised by the following steps: 1) preparation of a solution of CS/KS in water and measurement of its conductivity; 2) addition of a salt until the conductivity reaches the critical value of interest for the process; salt is not added if the sole presence of CS/KS already guarantees said value at the outset; 3) gradual addition to this aqueous solution of a calculated amount of organic phase, consisting of one or more solvents miscible together and with the amount of water specified in step 1; when the addition of the organic solvent has been completed, the initially monophasic system becomes biphasic, with a CS concentration in the dense phase and a KS concentration in the light phase; 4) recovery by precipitation, with 2-3 volumes of ethanol, of CS from the denser phase and KS from the less dense phase.

A systematic approach for identifying the optimum purification conditions at industrial level involves, for a certain type of CS/KS ("same type" means that the differences between the levels of contamination of CS by KS must fall within an interval not exceeding 2-3%) and for a given organic solvent, the construction of a diagram wherein the conductivity or concentration of the aqueous solution, containing CS/KS and any added salts, is shown as a function of the amount of organic phase needed to induce the formation of the two liquid phases useful for the purification process. When the type of CS/KS and the nature of the selected organic solvent have been established, it is therefore possible to identify from the graph constructed for that type of organic solvent the pair of values (conductivity of aqueous solution and amount of organic solvent) that leads to the formation of the two liquid phases forming the basis of the purification process. Values falling below said parameters (lower conductivity values or smaller amounts of solvent) lead to low recoveries or absence of phase separation, while higher conductivity values or larger amounts of organic solvent convert both CS and KS to the dense phase, causing the purification process to lose its efficacy.

When the concentration of CS/KS at which it is desired to conduct the purification process has been established, the amount of salt (if any) to be added to bring the conductivity to the critical value that induces the formation of the two liquid phases is determined.

When the type of organic solvent to be used has been selected, and the operating conditions have been defined experimentally with the construction of the conductivity graph of the aqueous solution containing CS/KS according to the amount of organic phase needed to induce the separation of the two liquid phases forming the basis of the purification process, this can be done in different ways, according to industrial convenience.

Method A)—When the type and amount of organic solvent to be used has been established, the conductivity value which the aqueous solution should have can be found on the graph. If this value is reached with the presence of CS/KS in solution only, the organic phase is added to the aqueous phase under stirring. Initially there is always a monophasic system, and only after addition of all the organic solvent will the formation of two liquid phases be observed which determines the compartmentalisation of CS in the dense phase and KS in the light phase. If the critical conductivity value of the aqueous phase is not reached with the presence of CS/KS in solution only, a salt is added until the desired conductivity is reached, and the organic solvent is then added as previously described.

Method B)—When the conductivity value of the aqueous solution containing CS/KS and any added salts has been established, the amount of solvent to be used is found on the graph, and the solvent is added to the aqueous solution as described for method A).

Examples of organic solvents which can be used in the CS/KS purification process according to the invention are methanol, ethanol, 1-propanol, 2-propanol, acetone, acetonitrile and mixtures thereof.

The process according to the invention not only provides a CS with specifications compatible with the strictest regulations soon to be implemented by the regulatory authorities, but also large amounts of KS, a product which is so far unavailable on the market, for which important applications can be postulated, especially in the ophthalmological field (U.S. Pat. No. 5,141,928; U.S. Pat. No. 6,159,954) and as a compound with immunogenic activity, so far demonstrated in vitro (Meller et al., Clin Chim Acta 1995, 236, 195-204; Nakano T., Carbohydr Polym, 2014, 99, 547-552).

The separation processes claimed produce recoveries close to the theoretical values and purity >98%.

The CS/KS purification process is preferably performed at a neutral pH, which produces the best results in terms of both yield and purity.

The time when the two phases are maintained under stirring to allow optimum redistribution of the two KS solutes in the light phase and CS in the dense phase is not critical. The yields and degree of purity vary little if said time is only 1.5 h or 18 h.

Similarly, the temperature at which the process is performed is not very critical; it can be conducted in a wide temperature range (e.g. from 4 to 25° C.) without any substantial effect on yields or purity.

The purification process claimed is applicable to CS/KS obtained by different methods and using cartilage from different sources.

By operating at particularly high CS/KS concentrations, better purifications can be obtained by resubjecting the dense phase to a subsequent identical purification cycle, after diluting it to the concentration of the sample originally treated.

It has now surprisingly been found that the CS/KS purification process, in parallel with the separation of CS from KS, also significantly reduces the pyrogen content.

The application of the method claimed has for the first time produced pure CS and KS standards, the pre-requisite for the application of the new product specifications that the regulatory authorities are preparing to issue.

The following examples describe the invention in more detail.

Example 1—FPLC Analysis of CS/KS, CS and KS Samples

This analytical, preparatory chromatography methodology allows CS/KS samples to be separated on the scale of hundredths of a mg, making available samples with a purity exceeding 99%, not currently available on the market, and usable as reference standards for all the validation processes that the regulatory authorities are likely to establish in the immediate future. The standards prepared are used for all calibrations of the analysis methods used to characterise the purity of CS and KS described below.

The method uses a HiLoad Q sepharose 26/10 HP GE Healthcare column functionalised with a strong anion exchanger, mounted on an Akta Explorer 100 Amersham chromatograph (GE Healthcare) equipped with a UV/Vis detector. A linear gradient of two buffers is used as eluent system: buffer A—20 mM sodium acetate, pH 7.4, 0.5M NaCl; buffer B—20 mM sodium acetate, pH 7.4, 3.0 M NaCl. The conditions for optimum separation of CS and KS are: linear gradient 0-100% of B in A in 106 min; flow rate 2 mL/min, UV detection 215 nm. 300 mg samples dissolved in 5 mL of buffer A are analysed. Under the analysis conditions described, the elution time of the non-retained analyte is 50 min, that of CS is 193 min, and that of KS is 268 min.

Using a CS/KS sample of marine origin, CS and KS standards with a degree of purity >99% are obtained, recovering the eluates corresponding to the two peaks of CS and KS, which are ultrafiltered through membranes with a 3 KDa cut-off to remove the salts and lyophilisates. The samples thus obtained are characterised as reported in examples 2-4 below.

Example 2—Characterisation of CS and KS by SEC-TDA

The characterisation, in terms of molecular mass, molecular weight distribution, polydispersity and intrinsic viscosity, of commercial CS/KS products and of the CS and KS standards obtained as described in example 1, was conducted with a size-exclusion chromatograph (Viscotek, Lab-Service Analytica, Italy) consisting of two modules and dedicated management software:

module GPCmax VE 2001 is an integrated system consisting of a specific pump for gel filtration chromatography (GPC) (isocratic pump able to ensure a constant, pulsation-free flow of solvent), an online solvent degasser and an autosampler;

module TDA302 (Triple Detector Array) is an integrated system formed by an oven thermostated for the column and a triple detector, consisting of a refractive index (RI) detector, a viscometer (VS) detector with 4 capillary bridges, and a light scattering (LS) detector which in turn consists of two parts, a right angle light scattering (RALS) detector characterised by an excellent signal-to-noise ratio, and the novel low angle light scattering (LALS) detector;

OmniSEC™ is software for the management of GPCmax and TDA (Windows environment), which allows a polymer solution to be characterised in terms of concentration, mean absolute molecular weight, polydispersity index, molecular size (hydrodynamic and rotational radius) and intrinsic viscosity of the polymer. The dn/dc value (infinitesimal variation in signal intensity measured by the refractive index detector on variation of the concentration of the analyte) is 0.1466 mL/g for CS and 0.1000 mL/g for KS (Swann D. A. et al. J Biological Chemistry, 1984, 259, 12, 7693-7700).

Chromatography columns: the Viscotek chromatography system is equipped with a TSK-gel GMPWXL pre-column (Tosoh Bioscience, Cat. No. 08033, 6.0×4.0 cm, average particle size 12 µm), and 2 TSK-gel GMPWXL columns placed in series (Tosoh Bioscience, Italy, Cat. No. 8-08025, hydroxylated polymethacrylate-based material, pore size 100-1000 Å, mean particle size 13 µm, 7.8×30.0 cm).

viscometer column: TOSOH08033 pre-column and TOSOH08025 column, both marketed by Viscotek—Lab-Service Analytica S.r.l., Via Emilia, 51/c, 40011, Anzola Emilia (BO, Italy).

These are the chromatography conditions used for the analytical characterisation of the CE and KS samples: mobile phase 0.1M $NaNO_3$; temperature 40° C., flow rate 0.6 mL/min; run time 50 min.

Example 3—Characterisation of CS/KS, CS and KS by Acid Hydrolysis and HPLC-Dionex Analysis of Monoses To evaluate the composition of commercial CS/KS products and the degree of purity of CS and KS obtained as described in example 1, an analytical protocol was designed based on acid hydrolysis of the sample and chromatographic analysis of the monoses constituting the disaccharide units of the single glycosaminoglycan chains: acetylated galactosamine (GalNAc) and glucuronic acid (GlcA) for CS and glucosamine (GlcN) and galactose (Gal) for KS.

Preliminary tests with standards of said sugars demonstrate that during hydrolysis the two aminosugars are partly de-acetylated, each generating two different peaks, while GlcA and Gal generate one and three peaks respectively.

The analysis protocol as a whole allows the sample to be hydrolysed with an efficiency of 95-100%, and an equimolar determination of the concentration of the two monoses constituting the disaccharide units of the CS and KS chains respectively to be obtained. On the basis of the molar concentrations of the constituent sugars, it is possible to determine the percentage by weight of CS and KS present in the samples, less the water content, considering different mean molecular weight values of the disaccharide units according to the animal tissue of origin and the effect of the degree of sulphation and sodiation of the individual molecules.

Acid Hydrolysis—

The CS/KS, CS and KS samples undergo acid hydrolysis. In a standard procedure, 50 mg of sample are dissolved in 0.5 mL of 1M HCl prepared with MQ water. The hydrolysis is conducted at 100° C. for 18 h under stirring; the samples are then neutralised with 5M NaOH and analysed by anion-exchange chromatography.

HPLC Analysis of Monoses by Ion-Exchange Chromatography—

The products of hydrolysis are analysed by anion-exchange chromatography with pulsed amperometric detection (HPAEC-PAD), using an ionic chromatograph (ICS 3000, Dionex, Italy) with autosampler and double pump equipped with a Carbopac PA1 column (4×287.5 mM, Dionex, Italy) and pre-column. The chromatographic separation lasts for 41 min (0-12 min from 1 to 4 mM NaOH, 12-14 min 4 mM NaOH, 14-16 min 4 to 100 mM NaOH, 16-30 min 100 mM NaOH, 30-39 min 100-1 mM NaOH, 39-41 min 1 mM NaOH).

The calibration of CS and KS is conducted with purified standards for FPLC, containing residual contamination for CS by KS and for KS by CS≤2%, which are hydrolysed as previously described.

The calibration intercepts are obtained, in the case of KS, by plotting the sum of the areas of the peaks of GlcN and Gal and their derivatives as a function of known amounts of the hydrolysed KS standard, while in the case of CS the calibration intercept is obtained by plotting the sum of the areas of the peaks of GalNAc and GlcA and their derivatives as a function of known amounts of the CS standard.

The concentration (g/L) of KS in the samples is determined by adding the areas of the representative peaks for GlcN and Gal and their derivatives and calculating the concentration compared with the calibration intercept of hydrolysed KS standard, while the concentration (g/L) of CS in the samples is determined by adding the areas of the representative peaks for GalNAc and GlcA and their derivatives and calculating the concentration compared with the calibration intercept of hydrolysed CS standard. Finally, the percentages of KS and CS are found by calculating the ratios of the concentrations obtained to the sum total of the percentage concentrations.

Example 4—Characterisation of CS/KS, CS and KS by Methanolysis of GAGs, Acetylation of Methyl Glycosides and GC-MS Analysis of the Acetylated Methyl Glycosides Obtained To evaluate the composition of commercial CS/KS products and the degree of purity of CS and KS obtained as described in example 1, an analytical protocol has been designed involving methanolysis of GAGs with HCl, acetylation of the methyl glycosides obtained, and their analysis with GC-MS. In a standard procedure, 10 mg of the samples undergo methanolysis (1 mL of MeOH/HCl 1.25M, 80° C., 20 h), and the methyl glycosides obtained are acetylated with acetic anhydride (50 µL) and pyridine (50 µL) at 100° C. for 30 min. The acetylated methyl glycoside samples are analysed by GC-MS (Agilent Technologies, GC 6850°, MS 5973N) on a capillary column (Zebron ZB-5, Phenomenex, 30 m×0.25 mm i.d.), using a flow rate of 1 mL/min of helium (carrier gas) with the following temperature programme: 150° C. for 3 min, 150° C.→240° C. at 3° C./min. The MS detection conditions are: electronic ionisation source at 70 eV, quadrupole analyser, acquisition range 40-450 Da.

The methanolysis determines: complete depolymerisation by cleavage of the glycoside bonds, generating the corresponding methyl glucosides (in the case of GlcA both $\alpha$ and $\beta$ methyl glycoside are formed); deacetylation of GalNAc and GlcNAc; removal of all the sulphate groups.

The reaction mixtures are analysed with GC-MS. The sugars are identified by comparing the retention time and fragmentation with those of known standards.

The percentage molar composition of CS, KS and DS in the sample is calculated from the ratio between the areas underlying the peaks corresponding to the single methyl glycosides, normalised in relation to the analytical response of standard samples of methyl glycosides. Thus in a correct analysis, the molar concentrations of the Gal and GlcN methyl glycosides are equal and correspond to that of KS, the sum of the molar concentrations of GlcA methyl glycosides $\alpha$ and $\beta$ corresponds to that of CS, that of IduA methyl glycoside corresponds to that of DS, and the molar concentration of GalN methyl glycoside corresponds to the sum of the concentrations of CS+DS.

Example 5—Construction of a Graph Wherein the Conductivity of the Aqueous Solution of CS/KS is Shown as a Function of the Volume of 2-Propanol Required to Obtain the Purification of CS/KS A sample of CS/KS of marine origin is used, characterised by a CS content of 78% and a KS content of 22%; the following solutions (1 L) are prepared with concentrations in the 50-250 g/L range, and their conductivity value is measured. 2-propanol is added to each solution until they separate into two liquid phases, giving a % of dry residue of the dense phase that preferably falls into the range ±8 of the % of CS in the CS/KS mixture forming the subject of the purification process (for the sample analysed, dry residue of the dense phase between 70 and 86%). For both the CS/KS sample and the dry residue of the dense phase, the residual water content is considered equivalent and estimated at between 12-15% by weight.

Two graphs are constructed showing the CS/KS conductivity values or concentration values respectively as a function of the 2-propanol volumes necessary to obtain phase separation with these characteristics of the dense phase. All points found are aligned on an equation intercept $y=-0.0053x+1.7227$ ($R^2=0.9491$) for the graph of the volumes of 2-propanol as a function of the CS/KS concentration and on an equation intercept $y=-2x+0.0593$ ($R^2=0.9743$) for the graph of the volumes of 2-propanol as a function of the conductivity of the solution.

In the design of the operating conditions at industrial level for this type of CS/KS, once a value of the conductivity imparted by CS/KS or the CS/KS concentration has been defined, the volume of 2-propanol to be added to obtain the separation into two liquid phases that leads to a CS with a purity >95% is therefore automatically defined. Similarly, once the volume of 2-propanol to be used has been established, the conductivity or concentration which the CS/KS solution must have can be unequivocally established. In process, if the solution to be treated has a CS/KS concentration lower than that necessary to reach the desired conductivity value, said value is reached by adding NaCl or other salts. Table 4 shows the experimental data. The CS and KS samples obtained are analysed as indicated in examples 1, 3 and 4.

TABLE 4

Purification of CS/KS of marine origin (CS 78.4%; KS 21.6%) using 2-propanol as organic solvent.

| CS/KS | | 2-propanol | Recovery of dense phase | Composition of dense phase (%) | |
|---|---|---|---|---|---|
| g/L | (mS/cm) | (L) | (%)* | CS | KS |
| 250 | 28.6 | 0.45 | 89.2 | 97.8 | 2.2 |
| 230 | 27.4 | 0.50 | 86.4 | 88.1 | 11.9 |

TABLE 4-continued

Purification of CS/KS of marine origin (CS 78.4%; KS 21.6%) using 2-propanol as organic solvent.

| CS/KS | | 2-propanol | Recovery of dense phase | Composition of dense phase (%) | |
|---|---|---|---|---|---|
| g/L | (mS/cm) | (L) | (%)* | CS | KS |
| 200 | 26.2 | 0.70 | 69.4 | 95.0 | 5.0 |
| 166 | 22.4 | 0.75 | 76.6 | 96.2 | 3.8 |
| 120 | 18.5 | 1.00 | 64.6 | 95.5 | 4.5 |
| 100 | 17.4 | 1.10 | 83.3 | 98.3 | 1.7 |
| 50 | 10.1 | 1.60 | 62.4 | 82.7 | 17.3 |

Example 6—Construction of a Graph Wherein the Conductivity of the Aqueous Solution of CS/KS is Shown as a Function of the Volume of Ethanol Required to Obtain the Purification of CS/KS A sample of CS/KS of marine origin is used, characterised by a CS content of 78% and a KS content of 22%; solutions (1 L) are prepared with concentrations in the 120-250 g/L range, and the value of their conductivity is measured. Ethanol is added to each solution until they separate into two liquid phases giving a % of dry residue of the dense phase ±8% of the % of CS in the CS/KS mixture forming the subject of the purification process (for the sample analysed, dry residue of the dense phase between 70 and 86%). For both the CS/KS sample and the dry residue of the dense phase, the residual water content is deemed equivalent and estimated at between 12 and 15% by weight.

Two graphs are constructed showing the CS/KS conductivity or concentration values as a function of the ethanol volumes required to obtain phase separation with these characteristics of the dense phase. All points found are aligned on an equation intercept $y=-0.0049x+2.344$ ($R^2=0.9661$) for the graph of the volumes of ethanol as a function of the CS/KS concentration and on an equation intercept $y=-0.0658x+3.0284$ ($R^2=0.9885$) for the graph of the volumes of ethanol as a function of the conductivity of the solution.

In the design of the operating conditions at industrial level for this type of CS/KS, once a value of the conductivity imparted by CS/KS or the CS/KS concentration has been defined, the volume of ethanol to be added to obtain the separation of the two liquid phases that leads to a CS with a purity >95% is therefore automatically defined. Similarly, once the volume of ethanol to be used has been established, the conductivity or concentration which the CS/KS solution must have can be unequivocally established. In process, if the solution to be treated has a CS/KS concentration lower than that necessary to reach the desired conductivity value, said value is reached by adding NaCl or other salts. Table 5 shows the experimental data. The CS and KS samples obtained are analysed as indicated in examples 1, 3 and 4.

TABLE 5

Purification of CS/KS of marine origin (CS 78.4%; KS 21.6%) using ethanol as organic solvent.

| CS/KS | | ethanol | Recovery of dense phase | Composition of dense phase (%) | |
|---|---|---|---|---|---|
| g/L | (mS/cm) | (L) | (%)* | CS | KS |
| 250 | 28.8 | 1.15 | 70.2 | 95.8 | 4.2 |
| 230 | 27.2 | 1.25 | 64.1 | 95.6 | 4.4 |

TABLE 5-continued

Purification of CS/KS of marine origin (CS 78.4%; KS 21.6%) using ethanol as organic solvent.

| CS/KS | | ethanol | Recovery of dense phase | Composition of dense phase (%) | |
|---|---|---|---|---|---|
| g/L | (mS/cm) | (L) | (%)* | CS | KS |
| 200 | 26.4 | 1.30 | 75.3 | 90.6 | 9.4 |
| 166 | 22.3 | 1.50 | 75.0 | 96.2 | 3.8 |
| 120 | 18.4 | 1.80 | 56.7 | 94.4 | 5.6 |

*Value of the conductivity generated by the presence of CS/KS in solution.

Example 7—Purification of CS/KS Using Different Solvent Mixtures

CS/KS of marine origin (CS 78.4%; KS 21.6%) is purified with different solvents. NaCl is added to five 1 L samples of aqueous solution, each containing 120 g/L of CS/KS (conductivity 18.8 mS/cm), until the final conductivity is 25.6 mS/cm (about 87.5 mM NaCl) for the solvents indicated below as A-C and 37.1 mS/cm (about 290 mM NaCl) for solvents D-E. The following solvents are added in sequence under vigorous stirring to the solutions thus prepared: A) 2-propanol 0.75 L; B) 1-propanol 0.75 L; C) 2-propanol/2-butanol 1.00/0.25 in volume 0.75 L; D) ethanol 1 L; E) acetone.

After the addition of organic solvent, the initially homogenous system gives rise to a separation into two liquid phases wherein CS concentrates selectively in the denser phase, while KS accumulates in the light phase. The biphasic system is kept under stirring for 18 h at room temperature, and then left to stratify. The two phases are precipitated under vigorous stirring by adding 2-3 volumes of ethanol; the precipitate is dried under vacuum to obtain CS and KS respectively in the form of white microcrystalline powders. Table 6 shows the experimental results. The CS and KS samples obtained are analysed as indicated in examples 1, 3 and 4.

As indicated by the data in Table 6, the process developed depends on the nature of the solvent, but the versatility of the process always allows the operating parameters (CS/KS concentration, nature of solvent, ionic strength) to be optimised.

TABLE 6

Purification of CS/KS of marine origin (CS 78.4%; KS 21.6%) using different solvent mixtures

| Solvent added/(L) | Weight of dense phase (g) | Recovery of dense phase (%)* | Composition of dense phase (%) | |
|---|---|---|---|---|
| | | | CS | KS |
| A/0.75 | 258 | 76.1 | 96.1 | 3.9 |
| B/0.75 | 183 | 43.0 | 84.1 | 15.9 |
| C/0.75 | 323 | 89.7 | 80.9 | 19.1 |
| D/1.00 | 271 | 76.6 | 97.7 | 2.3 |
| E/1.00 | 11.116 | 64.8 | 93.8 | 6.8 |

*100 is the amount of CS/KS treated.

Example 8—Effect of the Chemical Nature of the Salt on the Purification of CS/KS Samples CS/KS of marine origin (CS 78.4%; KS 21.6%) is purified using different salts to reach the critical conductivity value.

The following are added respectively to three 1 L samples of aqueous solution containing 120 g/L of CS/KS (conductivity 18.8 mS/cm): A) NaCl, B) CaCl$_2$, C) K$_2$SO$_4$ until the final conductivity is 25.6 mS/cm. 0.75 L of 2-propanol is added under vigorous stirring to the three solutions thus prepared. After the addition of organic solvent, the initially homogenous system gives rise to a separation into two liquid phases wherein CS concentrates selectively in the denser phase, while KS accumulates in the light phase. The biphasic system is kept under stirring for 18 h at room temperature, and then left to stratify. The two phases are precipitated under vigorous stirring by adding 2-3 volumes of ethanol; the precipitate is dried under vacuum to obtain CS and KS respectively in the form of white microcrystalline powders. Table 7 shows the experimental results. The CS and KS samples obtained are analysed as indicated in examples 1, 3 and 4.

TABLE 7

Purification of CS/KS of marine origin (CS 78.4%; KS 21.6%) using different salts.

| Salt | Weight of dense phase (g) | Recovery of dense phase (%)* | Composition of dense phase (%) CS | KS |
|---|---|---|---|---|
| NaCl | 403 | 76.1 | 96.1 | 3.9 |
| CaCl$_2$ | 309 | 87.7 | 89.2 | 10.8 |
| K$_2$SO$_4$ | 353 | 81.2 | 95.5 | 4.5 |

*100 is the amount of CS/KS treated.

As indicated by the data in Table 7, the process developed depends on the nature of the salt used to reach the conductivity necessary to obtain separation into two liquid phases, but the versatility of the process always allows the operating parameters (CS/KS concentration, nature of solvent, ionic strength) to be optimised.

Example 9—Effect of pH on Purification of CS/KS Samples

Purification of CS/KS of marine origin (CS 78.4%; KS 21.6%) at different pH values. Two samples of CS/KS (120 g/L) are adjusted to pH 4.1 (19.6 mS/cm) and 8.1 (18.9 mS/cm), using 1M aqueous solutions of HCl and NaOH respectively. NaCl is added to the aqueous solutions until the final conductivity is 25.6 mS/cm; 0.75 L of 2-propanol is then added under vigorous stirring until the solution separates into two liquid phases. After the addition of organic solvent, the initially homogenous system gives rise to the formation of two liquid phases wherein CS concentrates selectively in the denser phase, while KS accumulates in the light phase. The biphasic system is kept under stirring for 18 h at room temperature, and then left to stratify. The two phases are precipitated under vigorous stirring by adding 2-3 volumes of ethanol; the precipitate is dried under vacuum to obtain CS and KS in the form of white microcrystalline powders. Table 8 shows the experimental results. The CS and KS samples obtained are analysed as indicated in examples 1, 3 and 4.

As can be seen from the data in Table 8, the CS/KS purification process depends on the pH of the solution, with results which are best in terms of both yield and purity at neutral pH values. The CS and KS samples obtained are analysed as indicated in examples 1, 3 and 4.

TABLE 8

Purification of CS/KS of marine origin (CS 78.4%; KS 21.6%) at different pH values.

| pH | Weight of dense phase (g) | Recovery of dense phase (%)* | Composition of dense phase (%) CS | KS |
|---|---|---|---|---|
| 4.1 | 366 | 81.9 | 93.0 | 7.0 |
| 6.7 | 403 | 76.1 | 96.1 | 3.9 |
| 8.1 | 454 | 94.7 | 80.3 | 19.7 |

*100 is the amount of CS/KS treated. ° pH of 120 g/L solution of CS/KS.

Example 10—Effect of Temperature on the Purification Process of CS/KS Samples

To verify the criticality of temperature on the CS/KS purification process, two CS/KS samples of marine origin are prepared (CS 78.4%; KS 21.6%) (120 g/L; 18.8 mS/cm) dissolved in 1 L of water. NaCl is added to the two solutions up to a final conductivity of 25.6 mS/cm. Operating at 4 and 25° C., 0.75 L of 2-propanol is then added under vigorous stirring. After the addition of organic solvent, the initially homogenous system gives rise to a separation into two liquid phases wherein CS concentrates selectively in the denser phase, while KS accumulates in the light phase. The biphasic system is kept under stirring for 18 h at 4 and 25° C. respectively. The two phases are then collected and precipitated under vigorous stirring by adding 2-3 volumes of ethanol; the precipitates are dried under vacuum to obtain CS and KS respectively in the form of white microcrystalline powders. Table 9 shows the experimental results. The CS and KS samples obtained are analysed as indicated in examples 1, 3 and 4.

As indicated by the data in Table 9, the process developed depends marginally on the nature of the temperature, the best results in terms of purity being obtained by operating at 25° C.

TABLE 9

Purification of CS/KS of marine origin (CS 78.4%; KS 21.6%) at different temperatures

| Temp. | Weight of dense phase (g) | Recovery of dense phase (%)* | Composition of dense phase (%) CS | KS |
|---|---|---|---|---|
| 4° C. | 375 | 79.1 | 94.2 | 5.8 |
| 25° C. | 403 | 76.1 | 96.1 | 3.9 |

*100 is the amount of CS/KS treated.

Example 11—Effect of CS/KS Concentration on the Purification Process Using Ethanol as Organic Solvent To evaluate the critical factors of the CS/KS concentration in the purification process, six 1 L samples of CS/KS of the concentration shown in Table 10 are prepared. NaCl is added to samples A-C to obtain a final conductivity ranging between 38 and 40 mS/cm. Ethanol is then added to the solutions, under vigorous stirring, in a amount sufficient to induce separation into two liquid phases in the originally homogenous water-alcohol solution, with a selective concentration of CS in the dense phase and KS in the light phase. The biphasic system is kept under stirring for 18 h at room temperature, and then left to stratify. The two phases of each sample are collected and precipitated under vigorous stirring by adding 2-3 volumes of ethanol and the precipitate is dried under vacuum, obtaining CS and KS respectively in the form of white microcrystalline powders. Table 10 shows the experimental results. The CS and KS samples obtained are analysed as indicated in examples 1, 3 and 4. As will be seen from the data in Table 10, the concentration plays a critical role, especially as regards the degree of purity. Lower concentrations allow CS with a purity >96% to be obtained.

TABLE 10

Purification of CS/KS of marine origin (CS 78.4%; KS 21.6%) using different concentrations of CS/KS.

| CS/KS (g/L) | mS/cm from CS/KS | NaCl (M) | final mS/cm | Ethanol (L) | Recovery of dense phase (%)* | Composition of dense phase (%) | |
|---|---|---|---|---|---|---|---|
| | | | | | | CS | KS |
| A) 200 | 20.0 | 0.20 | 38.1 | 1.00 | 96.0 | 92.1 | 7.9 |
| B) 100 | 16.3 | 0.30 | 38.8 | 1.00 | 74.6 | 97.7 | 2.3 |
| C) 67 | 11.7 | 0.35 | 40.0 | 1.00 | 65.4 | 97.9 | 2.1 |
| D) 250 | 28.8 | — | 28.8 | 1.15 | 70.2 | 95.8 | 4.2 |
| E) 166 | 23.4 | — | 23.4 | 1.50 | 75.0 | 91.7 | 8.3 |
| F) 100 | 16.3 | — | 16.3 | 1.75 | 66.3 | 93.5 | 6.5 |

*100 is the amount of CS/KS treated.

Example 12—Effect of Rebalance Time in the CS/KS Sample Purification Process

To evaluate the critical factors in the process of purifying CS/KS samples in the rebalancing time of the biphasic system obtained by maintaining the system of two separate phases under vigorous stirring, two samples of CS/KS of marine origin (CS 78.4%; KS 21.6%) (120 g/L; 18.8 mS/cm) are prepared and dissolved in 1 L of water. NaCl is added to the two solutions until the final conductivity is 25.6 mS/cm. Operating at 25° C., 0.75 L of 2-propanol is then added under vigorous stirring. After the addition of organic solvent, the initially homogenous system gives rise to a separation into two liquid phases wherein CS concentrates selectively in the denser phase, while KS accumulates in the light phase. The biphasic system is kept under stirring at 25° C. for 1.5 and 18 h respectively. The two phases are then collected and precipitated under vigorous stirring by adding 2-3 volumes of ethanol; the precipitates are dried under vacuum to obtain CS and KS respectively in the form of white microcrystalline powders. The experimental results are reported in Table 10. The CS and KS samples obtained are analysed as indicated in examples 1, 3 and 4. As emerges from the data in Table 11, the process developed depends to a modest extent on the rebalancing time of the two phases, slightly better recoveries and purity being obtaining at longer times.

TABLE 11

Purification of CS/KS of marine origin (CS 78.4%; KS 21.6%) using different system rebalancing times for the two separate phases.

| Stirring time | Weight of dense phase (g) | Recovery of dense phase (%)* | Composition of dense phase (%) | |
|---|---|---|---|---|
| | | | CS | KS |
| 1.5 h | 424 | 72.7 | 95.4 | 4.6 |
| 18 h | 403 | 76.1 | 96.1 | 3.9 |

*100 is the amount of CS/KS treated.

Example 13—Effect of CS/KS Extraction Source on the Purification Process

To evaluate the critical factors inherent in the nature of the CS/KS sample to be purified, three samples of marine origin and two of porcine origin are analysed. 1 L solutions in water of the five samples (120 g/L; 18.8 mS/cm) were prepared. NaCl is added to the solutions until the final conductivity is 25.6 mS/cm. Operating at 25° C., 0.75 L of 2-propanol is then added under vigorous stirring. After the addition of organic solvent, the initially homogenous system gives rise to a separation into two liquid phases wherein CS concentrates selectively in the denser phase, while KS accumulates in the light phase. The biphasic system is kept under stirring for 18 h. The two phases of the various samples are then collected and precipitated under vigorous stirring by adding 2-3 volumes of ethanol; the precipitates are dried under vacuum to obtain CS and KS respectively in the form of white microcrystalline powders. Table 12 shows the experimental results. The CS and KS samples obtained were analysed as indicated in examples 1, 3 and 4.

TABLE 12

Purification of CS/KS extracted from marine and porcine sources. The data demonstrate that the method claimed can be used regardless of the type of CS/KS employed in the purification process. Obviously the less the starting product is contaminated by KS, the purer will be the final purified CS, as emerges from the purity data for the samples of porcine origin, which are already purer initially than those of marine origin.

| Origin of CS/KS sample | Composition (%) | | Weight of dense phase (g) | Recovery of dense phase (%)* | Composition of dense phase (%) | |
|---|---|---|---|---|---|---|
| | CS | KS | | | CS | KS |
| marine 13009 | 78.4 | 21.6 | 403 | 76.1 | 96.7 | 3.9 |
| marine 13010 | 80.3 | 19.7 | 471 | 89.9 | 89.9 | 10.1 |
| porcine 13021 | 86.7 | 13.3 | 487 | 97.7 | 92.8 | 7.2 |
| porcine 13039 | 87.3 | 12.7 | 340 | 63.7 | 93.0 | 7.0 |

*100 is the amount of CS/KS treated.

Example 14—Repurification of CS from Light Phase

To improve the degree of purity obtained, in particular when using very high concentrations of CS/KS, the dense phase can be directly subjected to the purification process again. It is first diluted with water to obtain the concentration originally used in the first purification process, and the entire process is then repeated.

TABLE 13

CS/KS sample purification process involving a first purification step using 2-propanol and a second step wherein the dense phase is diluted twice (about 110 g/L) and undergoes a second cycle identical to the first.

| Purifications | Weight of dense phase (g) | Recovery of dense phase (%)* | Composition of dense phase (%) | |
|---|---|---|---|---|
| | | | CS | KS |
| CS/KS | — | — | 76.4 | 23.6 |
| 1st purification | 435.19* | — | 94.5 | 5.5 |
| 2nd purification | 72 | 90 | 99.3 | 0.7 |

*100 is the amount of CS/KS treated.

The invention claimed is:

1. A method for the separation of chondroitin sulphate (CS) and keratan sulphate (KS) from an aqueous solution containing them, comprising adding to the aqueous solution a water-miscible organic solvent under conditions of ionic strength, which induces formation of two liquid phases with an interface in-between: a dense phase in which CS concentrates, said dense phase primarily comprising said water-miscible organic solvent and a light phase in which KS concentrates, said light phase primarily comprising water, wherein said water-miscible organic solvents are selected from the group consisting of 2-propanol, 1-propanol, 2-propanol/2-butanol, ethanol and acetone.

2. Method according to claim 1 comprising:
   a) preparing an aqueous solution of CS/KS and determining its conductivity;
   b) optionally adding a salt able to dissociate in mono- or polyvalent ions to a pre-set conductivity value;
   c) gradually adding an amount of one or more of said water-miscible organic solvents so as to induce a phase separation with concentration of CS in the dense phase and KS in the light phase.

3. Method according to claim 2 wherein the salt optionally added is sodium chloride.

4. Method according to claim 1 wherein the percentage by volume of each specific water-miscible organic solvent is determined by a graph correlating said percentage to the measured conductivity value, of the aqueous solution, or to the concentration of CS and KS, in the aqueous solution.

5. Method according to claim 1 wherein the dense phase containing CS is subjected to a further purification process.

6. Method according to claim 5 wherein the dense phase is diluted with water, thereafter adding said water-miscible organic solvent until the re-formation of two liquid phases: a dense phase in which CS concentrates and a light phase in which KS concentrates.

7. Method according to claim 1, wherein CS and KS are respectively recovered from the two liquid phases by precipitating CS with two volumes of ethanol and drying the precipitate, and precipitating KS by adding sodium chloride and drying the precipitate.

* * * * *